United States Patent
Zhao et al.

(10) Patent No.: US 12,154,204 B2
(45) Date of Patent: Nov. 26, 2024

(54) LIGHT-WEIGHT MACHINE LEARNING MODELS FOR LIP SYNC ANIMATION ON MOBILE DEVICES OR OTHER DEVICES

(71) Applicant: Samsung Electronics Co., Ltd., Suwon-si (KR)

(72) Inventors: Liang Zhao, Saratoga, CA (US); Siva Penke, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 333 days.

(21) Appl. No.: 17/673,645

(22) Filed: Feb. 16, 2022

(65) Prior Publication Data

US 2023/0130287 A1    Apr. 27, 2023

Related U.S. Application Data

(60) Provisional application No. 63/272,555, filed on Oct. 27, 2021.

(51) Int. Cl.
| | |
|---|---|
| *G06T 13/40* | (2011.01) |
| *G06T 13/20* | (2011.01) |
| *G10L 15/02* | (2006.01) |
| *G10L 15/04* | (2013.01) |

(52) U.S. Cl.
CPC ............ *G06T 13/205* (2013.01); *G06T 13/40* (2013.01); *G10L 15/02* (2013.01); *G10L 15/04* (2013.01)

(58) Field of Classification Search
None
See application file for complete search history.

(56) References Cited

U.S. PATENT DOCUMENTS

| | | | |
|---|---|---|---|
| 8,421,805 B2 | 4/2013 | Bishop | |
| 2005/0204286 A1 | 9/2005 | Buhrke | |
| 2016/0379112 A1* | 12/2016 | He | G06N 3/045 |
| | | | 706/25 |
| 2018/0075844 A1* | 3/2018 | Kim | G10L 15/065 |

(Continued)

FOREIGN PATENT DOCUMENTS

| | | | | |
|---|---|---|---|---|
| CN | 112639964 A | | 4/2021 | |
| KR | 20190100498 A | * | 8/2019 | ........... G10L 15/063 |
| WO | WO-2017027940 A1 | * | 2/2017 | ......... G06K 9/00315 |

OTHER PUBLICATIONS

Richard et al., "Audio- and Gaze-driven Facial Animation of Codec Avatars," arXiv.2008.05023v1 [cs.CV], Aug. 2020, 10 pages.

(Continued)

*Primary Examiner* — Aaron M Richer

(57) ABSTRACT

A method includes obtaining a speech segment. The method also includes generating, using at least one processing device of an electronic device, context-independent features and context-dependent features of the speech segment. The method further includes decoding, using the at least one processing device of the electronic device, a first viseme based on the context-independent features. The method also includes decoding, using the at least one processing device of the electronic device, a second viseme based on the context-dependent features and the first viseme. In addition, the method includes generating, using the at least one processing device of the electronic device, an output viseme based on the first and second visemes, where the output viseme is associated with a visual animation of the speech segment.

20 Claims, 7 Drawing Sheets

(56) References Cited

U.S. PATENT DOCUMENTS

| | | | |
|---|---|---|---|
| 2020/0234713 A1* | 7/2020 | Gowda | G10L 15/28 |
| 2020/0294495 A1 | 9/2020 | Li et al. | |
| 2020/0321020 A1 | 10/2020 | Scholar | |
| 2021/0082452 A1 | 3/2021 | Woffenden | |
| 2021/0174786 A1* | 6/2021 | Yun | G10L 15/20 |

OTHER PUBLICATIONS

Trivedi, "Realistic facial animations of 3D Avatars driven by Audio and Gaze," medium.com, Aug. 2020, 4 pages.

Karras et al., "Audio-Driven Facial Animation by Joint End-to-End Learning of Pose and Emotion," ACM Transactions on Graphics, vol. 36, No. 4, Article 94, Jul. 2017, 12 pages.

Nemire, "Generating Expressive 3D Facial Animations From Audio," NVIDIA Developer Blog, Jul. 2017, 3 pages.

Vougioukas et al., "End-to-End Speech-Driven Facial Animation with Temporal GANs," arXiv.1805.09313v4 [eess.AS], Jul. 2018, 14 pages.

* cited by examiner

LIGHT-WEIGHT MACHINE LEARNING MODELS FOR LIP SYNC ANIMATION ON MOBILE DEVICES OR OTHER DEVICES

CROSS-REFERENCE TO RELATED APPLICATION AND PRIORITY CLAIM

This application claims priority under 35 U.S.C. § 119(e) to U.S. Provisional Patent Application No. 63/272,555 filed on Oct. 27, 2021. This provisional application is hereby incorporated by reference in its entirety.

TECHNICAL FIELD

This disclosure relates generally to animation systems. More specifically, this disclosure relates to light-weight machine learning models for lip sync animation on mobile devices or other devices.

BACKGROUND

Audio-driven three-dimensional (3D) avatar animation typically involves the generation and display of a 3D avatar or character having a face that moves while audio information imitating a voice is played to a user. Ideally, the movements of the character's mouth and other facial features match the playback of the audio information, thereby supporting effective lip syncing between the audio information and the facial animations. Audio-driven 3D avatar animation using deep learning models has shown great promise for providing realistic 3D facial animations on mobile devices, such as smartphones, smart watches, and tablet computers.

SUMMARY

This disclosure relates to light-weight machine learning models for lip sync animation on mobile devices or other devices.

In a first embodiment, a method includes obtaining a speech segment. The method also includes generating, using at least one processing device of an electronic device, context-independent features and context-dependent features of the speech segment. The method further includes decoding, using the at least one processing device of the electronic device, a first viseme based on the context-independent features. The method also includes decoding, using the at least one processing device of the electronic device, a second viseme based on the context-dependent features and the first viseme. In addition, the method includes generating, using the at least one processing device of the electronic device, an output viseme based on the first and second visemes, where the output viseme is associated with a visual animation of the speech segment.

In a second embodiment, an apparatus includes at least one processing device configured to obtain a speech segment and generate context-independent features and context-dependent features of the speech segment. The at least one processing device is also configured to decode a first viseme based on the context-independent features and decode a second viseme based on the context-dependent features and the first viseme. The at least one processing device is further configured to generate an output viseme based on the first and second visemes, where the output viseme is associated with a visual animation of the speech segment.

In a third embodiment, a non-transitory computer readable medium contains instructions that when executed cause at least one processor of an electronic device to obtain a speech segment and generate context-independent features and context-dependent features of the speech segment. The medium also contains instructions that when executed cause the at least one processor to decode a first viseme based on the context-independent features and decode a second viseme based on the context-dependent features and the first viseme. The medium further contains instructions that when executed cause the at least one processor to generate an output viseme based on the first and second visemes, where the output viseme is associated with a visual animation of the speech segment.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOME-POD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
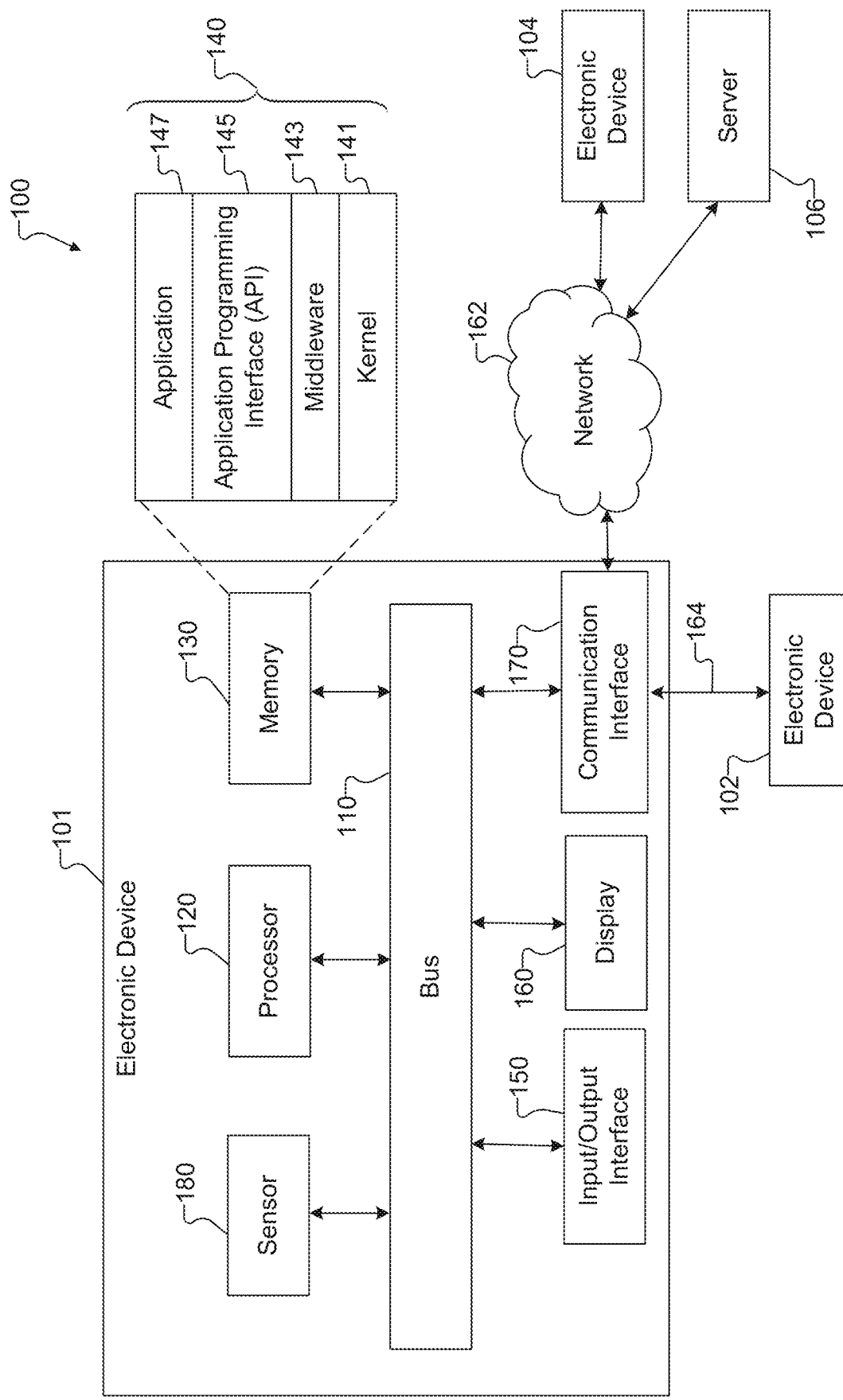
FIG. 1 illustrates an example network configuration including an electronic device in accordance with this disclosure.

FIGS. 1 through 9, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, audio-driven three-dimensional (3D) avatar animation typically involves the generation and display of a 3D avatar or character having a face that moves while audio information imitating a voice is played to a user. Ideally, the movements of the character's mouth and other facial features match the playback of the audio information, thereby supporting effective lip syncing between the audio information and the facial animations. Audio-driven 3D avatar animation using deep learning models has shown great promise for providing realistic 3D facial animations on mobile devices, such as smartphones, smart watches, and tablet computers. However, current approaches for audio-driven 3D avatar animation using deep learning models can suffer from a number of shortcomings.

As examples of these shortcomings, many deep learning techniques use manually-designed acoustic features, such as Mel-frequency cepstral coefficients (MFCC), as inputs. Unfortunately, this can result in sub-optimal performance since these techniques are not discriminative, and calculated features generated using more resource-constrained devices (such as mobile devices) can differ from calculated features generated using less resource-constrained devices (such as personal computers). Also, while automatic learning of acoustic features may be possible using deep learning techniques, these techniques often use transformers as encoders/decoders. Transformers may require large amounts of training data for proper training, and the resulting machine learning models tend to be extremely large (such as around 800 million parameters or more) and tend to overfit the training data. As a result, these techniques and models are generally not applicable to mobile devices or other devices that are more resource-constrained. Moreover, techniques that use transformers as encoders/decoders typically perform context-independent encoding and context-dependent encoding sequentially, and these techniques typically employ attention mechanisms for encoding context information. However, these approaches process all portions of input speech in the same way, even though some portions of the input speech are context-independent while other portions of the input speech are context-dependent. Also, the use of sequential processing and the use of attention mechanisms often require processing a whole sequence as an input, which can require the use of large models and can cause delays. Delays such as this are often particularly noticeable on mobile devices like smartphones, smart watches, and tablet computers. Overall, these issues typically result in trained machine learning models that are large and slow, and the machine learning models typically require more data and more time to train and more time to generate inferencing results during use.

This disclosure provides techniques for generating and using light-weight machine learning models for lip sync animation on mobile devices or other devices. As described in more detail below, a device can obtain speech segments to be processed, such as speech segments containing multiple audio frames. Note that each of the speech segments is not necessarily required to represent or include an entire input sentence. The device can use a context-independent encoder and a context-dependent encoder to respectively generate context-independent features and context-dependent features of the speech segments. The device can also use a context-independent decoder to generate first visemes based on the context-independent features and use a context-dependent decoder to generate second visemes based on the context-dependent features and the first visemes. In addition, the device can generate output visemes based on the first and second visemes. The output visemes may be used to support functions such as facial animations or other visual animations of 3D avatars or other characters.

Among other things, the described techniques allow for decoupling the generation of the context-independent features from the generation of the context-dependent features. As a result, in some embodiments, the context-independent features and the context-dependent features can be generated using the speech segments in parallel or simultaneously, which can help to speed up the overall process. Also, the generation of the output visemes based on the first and second visemes can be performed using a dynamic router, which can select the most appropriate first and second visemes for use in generating the output visemes. In some cases, the dynamic router generates probabilities for different possible output visemes as weighted combinations of probabilities of the corresponding first and second visemes and selects the possible output viseme having a highest probability. This allows for dynamic generation of output visemes based on various factors, such as the speech segments being processed. In addition, the generation of the context-dependent features can be based (at least in part) on the context-independent features. For instance, one or more first visemes or other information related to one or more audio frames before and/or after a current audio frame being processed can be used to generate a second viseme. This allows the context-independent features to be used to represent a high-level or semantic context for the context-dependent decoding, and the context-dependent decoding can be said to produce a low-level or acoustic feature context.

In this way, light-weight machine learning models can be generated and used, where at least some embodiments of the light-weight machine learning models are suitable for use on a wide range of devices, including (but not limited to) mobile devices or other devices that are more resource-constrained. Also, at least some embodiments of the machine learning models can be used to process portions of sentences rather than waiting to process complete sentences, which can increase the speed of the machine learning models. Further, at least some embodiments of the machine learning models can be used to process context-independent and context-dependent portions of speech segments differently, which can result in improved performance. Moreover, at least some embodiments of the machine learning models can be trained with "few-shot" learning processes, meaning fewer training iterations and less training data are needed. In addition, at least some embodiments of the machine learning models may be trained "on device," which means on the mobile device or other device being used by a user. The training data used here can be collected by the device itself, and the training data may not be sent to a server or other external destination, which can help to protect user privacy. Overall, these techniques allow for the creation and use of smaller and faster trained machine learning models that require less data and less time to train and less time to generate inferencing results during use (compared to current deep learning approaches).

Note that the functionality described here may be used in any suitable applications, such as for real-time and personalized lip sync animation of 3D avatars or other characters displayed on mobile devices or other devices. However, this functionality may be used in any other suitable manner, such as to produce any other suitable animations. Also note that this type of functionality may be used with any suitable electronic devices, such as smartphones, smart watches, tablet computers, virtual reality (VR) and augmented reality (AR)-based devices, or digital televisions. However, this functionality may be used with any other suitable devices. In addition, note that this type of functionality may involve the use of any suitable trained machine learning model or models, such as one or more deep neural networks (DNNs) or other deep learning models. However, this functionality may be used with any other suitable machine learning model architectures.

The following terms are used in this patent document and can be defined as follows. A "viseme" generally refers to speech sounds that look similar visually when spoken. Thus, output visemes identified as being related to speech segments may be used to produce visual animations for those speech segments. A "context" generally refers to acoustic frames or speech sounds before and/or after an acoustic frame or speech sound being considered. A context can be considered during some operations to identify some visemes (context-dependent visemes) and not considered during other operations to identify other visemes (context-independent visemes). A "light-weight" machine learning model refers to a machine learning model that can be trained in real-time with limited training data and using a limited number of training iterations, which may involve the use of fewer computational resources and thereby enable the model to be trained on device.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). In some cases, the processor 120 can receive and process speech segments using a trained machine learning model to perform lip sync animation, such as for a 3D avatar or other displayed character. Also, in some cases, the processor 120 can receive training data and perform a training process in order to train the machine learning model.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications for processing speech segments using a trained machine learning model to perform lip sync animation and/or for performing a training process to train the machine learning model as discussed below. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. For example, one or more sensors 180 may include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some cases, the server 106 can receive and process speech segments using a trained machine learning model to perform lip sync animation, such as for a 3D avatar or other displayed character. Also, in some cases, the server 106 can receive training data and perform a training process in order to train the machine learning model.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
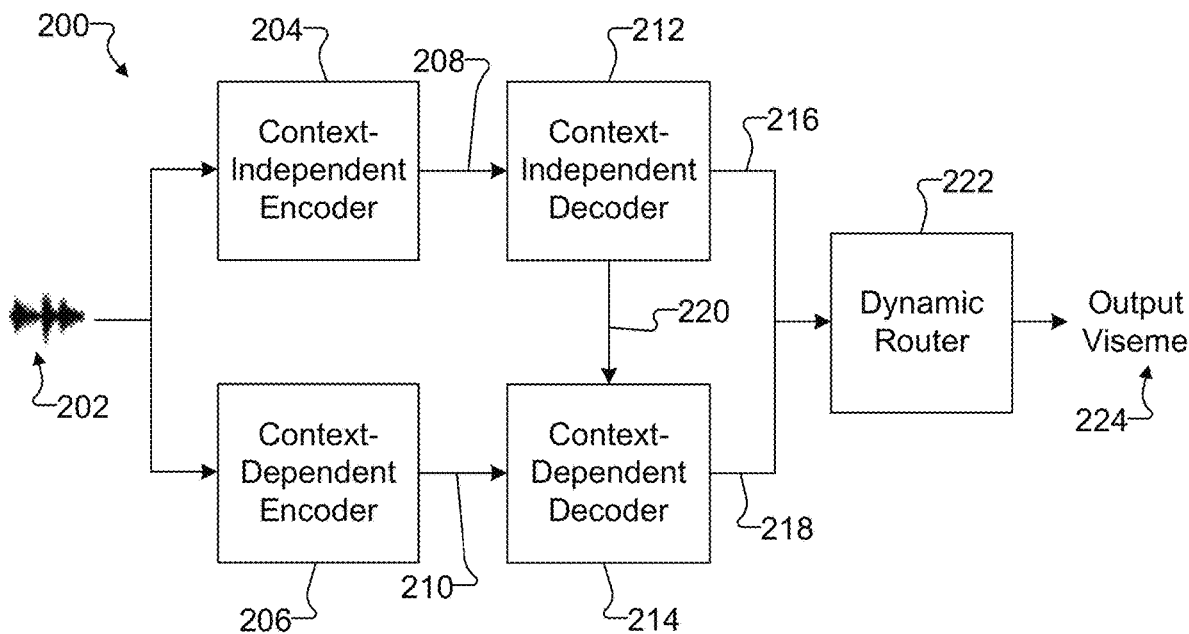
FIG. 2 illustrates an example architecture supporting the use of a light-weight machine learning model for lip sync animation on a mobile device or other device according to this disclosure.

FIG. 2 illustrates an example architecture 200 supporting the use of a light-weight machine learning model for lip sync animation on a mobile device or other device according to this disclosure. For ease of explanation, the architecture 200 shown in FIG. 2 is described as being implemented on or supported by the electronic device 101 in the network configuration 100 of FIG. 1. However, the architecture 200 shown in FIG. 2 could be used with any other suitable device and in any other suitable system, such as when the architecture 200 is implemented on or supported by the server 106.

As shown in FIG. 2, the architecture 200 generally operates to receive and process speech segments 202. Each speech segment 202 represents a portion of audio information that may be presented to a user or otherwise used to generate facial animations or other visual animations. In some embodiments, each speech segment 202 may represent a portion of a sentence, such as one word or several words to be used to generate one or more visual animations (although some speech segments 202 may represent complete sentences, such as short sentences). Each speech segment 202 may represent any suitable audio information in any suitable format, such as a raw segment of speech or a normalized segment of speech. Note that, since a speech segment 202 need not represent an entire sentence or other entire audio to be analyzed, the overall architecture 200 can be simplified. For example, smaller machine learning models may be used here since the speech segments 202 can be smaller, and this can reduce the amount of training data used for training the machine learning model without sacrificing performance. Also, since the machine learning model is smaller, the machine learning model can operate more quickly, which may allow (among other things) real-time transcription from waveforms to sequences of visemes during inferencing. In addition, depending on the implementation, the speech segments 202 may contain audio information in a single language, or the speech segments 202 may contain audio information in multiple languages since there may be some cases where a 3D avatar or other character may speak in multiple languages (such as when a user understands multiple languages).

The speech segments 202 are provided to a context-independent encoder 204 and a context-dependent encoder 206. The context-independent encoder 204 generally operates to process the speech segments 202 and produce context-independent audio features 208 of the speech segments 202. The context-independent features 208 represent audio features of the speech segments 202 that are not dependent on the context of the audio data. The context-dependent encoder 206 generally operates to process the speech segments 202 and produce context-dependent audio features 210 of the speech segments 202. The context-dependent features 210 represent audio features of the speech segments 202 that are dependent on the context of the audio data. In some cases, the context-independent features 208 may represent local acoustic features of the speech segments 202, and the context-dependent features 210 may represent correlation features of the speech segments 202. Also, in some cases, the context-independent encoder 204 and the context-dependent encoder 206 may operate simultaneously or in parallel, which means that the context-independent encoder 204 and the context-dependent encoder 206 may respectively generate the context-independent features 208 and the context-dependent features 210 at the same time or in an overlapping manner. In addition, since the context-independent encoder 204 and the context-dependent encoder 206 target different acoustic features, the context-independent encoder 204 and the context-dependent encoder 206 may each be designed compactly (such as by having a significantly-reduced number of model parameters compared to other approaches), operate more quickly compared to other approaches, and be trained in parallel.

The context-independent features 208 are provided to a context-independent decoder 212, and the context-dependent features 210 are provided to a context-dependent decoder 214. The context-independent decoder 212 generally operates to decode the context-independent features 208 and identify first visemes 216 associated with the speech segments 202. In other words, the context-independent decoder 212 can process the context-independent features 208 and identify visemes 216 that appear to be contained within the speech segments 202 based on the context-independent features 208. Similarly, the context-dependent decoder 214 generally operates to decode the context-dependent features 210 and identify second visemes 218 associated with the speech segments 202. In other words, the context-dependent decoder 214 can process the context-dependent features 210 and identify visemes 218 that appear to be contained within the speech segments 202 based on the context-dependent features 210.

The context-independent decoder 212 here also provides output data 220 to the context-dependent decoder 214, and the context-dependent decoder 214 can use the output data 220 when decoding the second visemes 218. The output data 220 generally represents information that provides a high-level or semantic context for use during context-dependent decoding. For example, the context-independent decoder 212 may be currently processing an audio frame from a speech segment 202, and the output data 220 may represent or include (i) one or more decoded visemes 216 or other information associated with one or more audio frames before the audio frame currently being decoded by the context-independent decoder 212 and/or (ii) one or more decoded visemes 216 or other information associated with one or more audio frames after the audio frame currently being decoded by the context-independent decoder 212. In some cases, the context-dependent decoder 214 may use the decoded first visemes 216 as labels identifying semantic-level context, and the context-dependent decoder 214 can consider these labels during the context-dependent decoding. Using the output data 220 from the context-independent decoder 212 can help to further improve the performance of the context-dependent decoder 214 by allowing the context-dependent decoder 214 to have some view of the overall context when decoding the context-dependent visemes (the second visemes 218). As a particular example, the decoded first visemes 216 here may play the role of a transcript that helps to provide explicit knowledge about the phoneme content of a speech segment 202.

The first visemes 216 and the second visemes 218 here may be generated for all portions of each speech segment 202. While this allows the visemes 216 and 218 to be generated quickly in parallel processing paths, it may not be known ahead of time which portion(s) of a speech segment 202 should be decoded using context-independent encoding/decoding and which portion(s) of the speech segment 202 should be decoded using context-dependent encoding/decoding. A dynamic router 222 is therefore used here to generate output visemes 224 based on the first and second visemes 216, 218. In some instances, for at least one output viseme 224, the dynamic router 222 may select one of the first visemes 216 or one of the second visemes 218 to produce the output viseme 224, meaning the output viseme 224 represents one of the visemes 216, 218 associated with at least a portion of a speech segment 202. In other instances, for at least one output viseme 224, the dynamic router 222 may combine one of the first visemes 216 and one of the second visemes 218 in some manner to produce the output viseme 224, meaning the output viseme 224 represents a combination of a first viseme 216 and a second viseme 218 associated with at least a portion of a speech segment 202. In some embodiments, the dynamic router 222 generates weighted combinations of the first visemes 216 and the second visemes 218 to produce the output visemes 224. In particular embodiments, for example, the dynamic router 222 may generate probabilities for different possible output visemes as weighted combinations of probabilities of corresponding first and second visemes 216-218 and select the possible output viseme having a highest probability as an output viseme 224. In some cases, each weighted combination of the probabilities of the first and second visemes 216-218 may represent a linear weighted sum that is determined based on multiple weights, where the weights are determined dynamically based on the training of the dynamic router 222. These or other types of operations allow for dynamic fusion of the first and second visemes 216-218 in order to generate the output visemes 224.

One or more machine learning models may be trained and used to implement the functions shown in or described with respect to FIG. 2. For example, different machine learning models may be used to implement the encoders 204 and 206, the decoders 212 and 214, and the dynamic router 222 of FIG. 2, or a single machine learning model may be used to implement these components of FIG. 2. In whatever manner the architecture 200 is implemented, the machine learning model(s) may be trained in any suitable manner to perform the described functions of the components in FIG. 2. As a particular example, the machine learning model(s) may be trained in stages so that different functions are trained in different stages. One example of a multi-stage training process is described below, although this multi-stage training process is for illustration only, and any other suitable training process may be used here.

It should be noted that the functions shown in or described with respect to FIG. 2 can be implemented in an electronic device 101, server 106, or other device in any suitable manner. For example, in some embodiments, at least some of the functions shown in or described with respect to FIG. 2 can be implemented or supported using one or more software applications or other software instructions that are executed by the processor 120 of the electronic device 101, server 106, or other device. In other embodiments, at least some of the functions shown in or described with respect to FIG. 2 can be implemented or supported using dedicated hardware components. In general, the functions shown in or described with respect to FIG. 2 can be performed using any suitable hardware or any suitable combination of hardware and software/firmware instructions.

The architecture 200 shown in FIG. 2 may provide various advantages or benefits depending on the implementation. For example, in some cases, the architecture 200 may support the processing of portions of an overall sentence in the speech segments 202 rather than requiring processing of the entire sentence, which can reduce the size and complexity of the machine learning model and increase the inferencing speed of the machine learning model. Also, in some cases, the features 208-210 may be determined in parallel rather than sequentially, which can further increase the inferencing speed of the machine learning model. Further, the architecture 200 is able to process different portions of the speech segments 202 appropriately, such as by selecting visemes 216 based on context-independent features 208 in some instances, selecting visemes 218 based on context-dependent features 210 in other instances, or combining the visemes 216-218 in still other instances. In addition, the visemes 218 may be produced based on the context-dependent features 210 and based on the output data 220, so output from the context-independent decoder 212 can be used as a high-level context by the context-dependent decoder 214, thereby allowing more effective context-dependent decoding.

As a particular example improvement that may be obtained using the approaches described in this patent document, the "wav2vec 2.0" framework represents a known framework for self-supervised learning of speech representations. An implementation of the wav2vec 2.0 framework may be produced using the known "TIMIT" training dataset, and this implementation of the wav2vec 2.0 framework may have a size of about 380 MB and an accuracy of about 68%. Implementing the architecture 200 of FIG. 2 using at least one machine learning model and training the machine learning model(s) using the TIMIT training dataset may produce an implementation having a size of about 2 MB and an accuracy of about 78%. Thus, the architecture 200 may obtain improved accuracy using one or more machine learning models of much smaller size. Note that the size and accuracy values provided above are for illustration only and do not limit the scope of this disclosure since machine learning implementations can easily vary both in terms of size and accuracy based on how machine learning models are actually implemented and trained.

Although FIG. 2 illustrates one example of an architecture 200 supporting the use of a light-weight machine learning model for lip sync animation on a mobile device or other device, various changes may be made to FIG. 2. For example, various functions shown in FIG. 2 may be combined, further subdivided, replicated, omitted, or rearranged and additional functions may be added according to particular needs.

Figure 3:
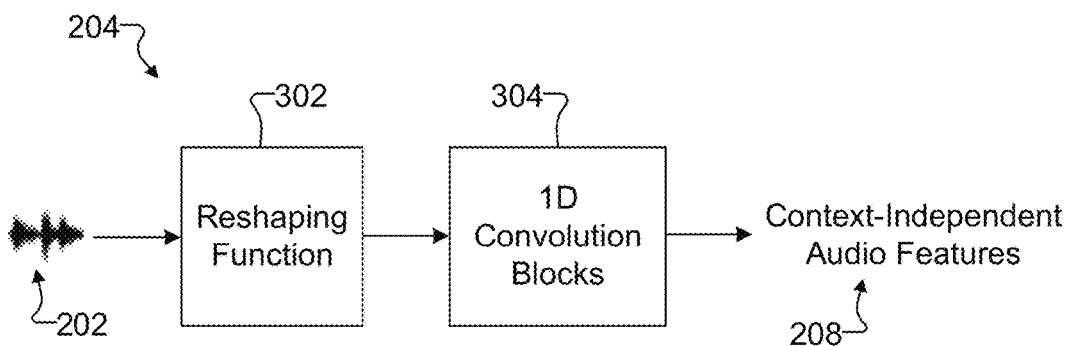
FIGS. 3 and 4 illustrate example encoders that may be used in the architecture of FIG. 2 according to this disclosure.
Figure 4:
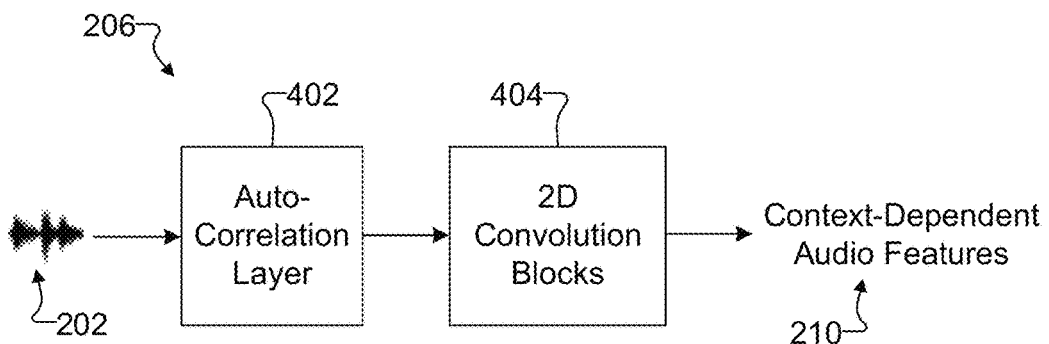

FIGS. 3 and 4 illustrate example encoders that may be used in the architecture 200 of FIG. 2 according to this disclosure. More specifically, FIG. 3 illustrates an example implementation of a context-independent encoder 204, and FIG. 4 illustrates an example implementation of a context-dependent encoder 206. However, the context-independent encoder 204 and the context-dependent encoder 206 may be implemented in any other suitable manner.

As shown in FIG. 3, the context-independent encoder 204 generally operates to process the speech segments 202 and generate the context-independent features 208 of the speech segments 202. In this example embodiment, the context-independent encoder 204 is implemented using a reshaping function 302 and a collection of one-dimensional (1D) convolution blocks 304. The reshaping function 302 generally operates to prepare the speech segments 202 for processing by the 1D convolution blocks 304. For example, the reshaping function 302 may convert a time-series sequence of data related to frequency content of audio data (as contained in or represented by the speech segments 202) into vectors or other suitable inputs for the 1D convolution blocks 304. The 1D convolution blocks 304 represent or implement convolution layers that operate on the data contained in or represented by the speech segments 202 in order to extract the context-independent audio features 208 related to the speech segments 202. In some cases, for instance, the 1D convolution blocks 304 may perform convolution operations along time and frequency domains so that different 1D convolution blocks 304 identify different audio features of the speech segments 202.

As shown in FIG. 4, the context-dependent encoder 206 generally operates to process the speech segments 202 and generate the context-dependent features 210 of the speech segments 202. In this example embodiment, the context-dependent encoder 206 is implemented using an auto-correlation layer 402 and a collection of two-dimensional (2D) convolution blocks 404. The auto-correlation layer 402 generally operates to process the speech segments 202 and identify correlations between different portions of the speech segments 202. For example, the auto-correlation layer 402 may identify correlations between different portions of a speech segment 202 and a delayed version of that speech segment 202. The 2D convolution blocks 404 represent or implement convolution layers that operate on the data representing the correlations in the speech segments 202 in order to extract the context-dependent audio features 210 related to the speech segments 202. In some cases, for instance, the 2D convolution blocks 404 may perform convolution operations along the time and frequency domains in order to extract context-dependent audio features 210 that are based on the correlations in the speech segments 202.

Figure 5:
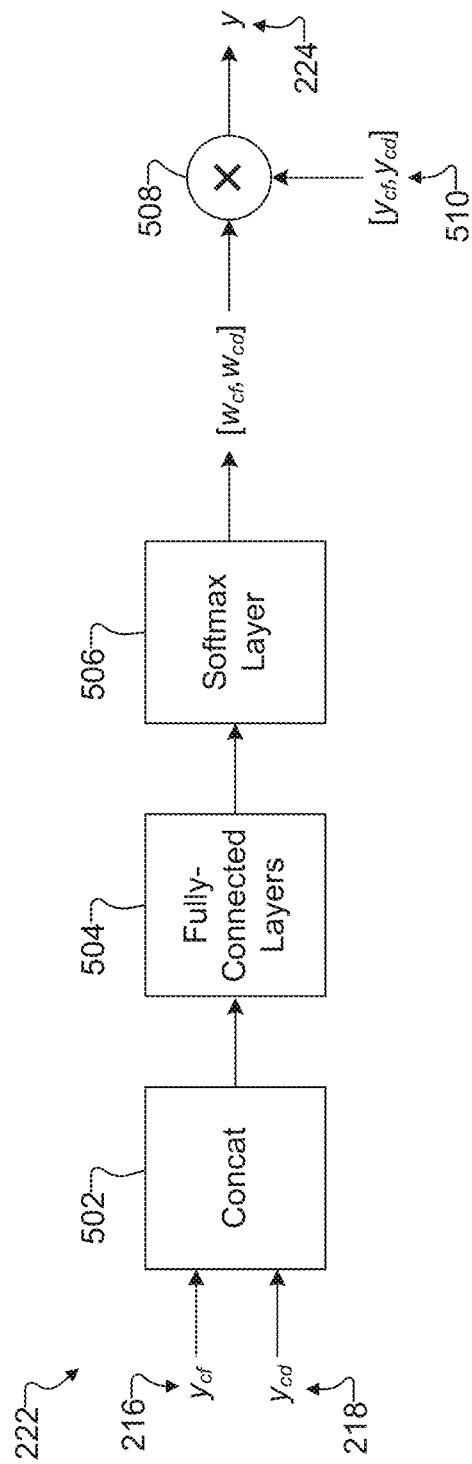
FIG. 5 illustrates an example dynamic router that may be used in the architecture of FIG. 2 according to this disclosure.

FIG. 5 illustrates an example dynamic router 222 that may be used in the architecture 200 of FIG. 2 according to this disclosure. However, the dynamic router 222 may be implemented in any other suitable manner. As shown in FIG. 5, the dynamic router 222 generally operates to process different probabilities of a first viseme 216 (denoted $y_{cf}$) and different probabilities of a second viseme 218 (denoted $y_{cd}$) in order to generate probabilities of an output viseme 224 (denoted y). Here, each viseme 216, 218 may be associated with different probabilities, such as probabilities that represent the likelihood of each viseme 216, 218 having a different possible value. In this particular example, the dynamic router 222 processes the probabilities of the visemes 216, 218 in order to identify weights $w_{cf}$ and $w_{cd}$ for the visemes 216, 218. An output viseme 224 can then be determined as a weighted combination of the probabilities of the visemes 216, 218. Since different probabilities can be associated with the visemes 216, 218, different weighted combinations may be identified to produce different output visemes, and the output viseme having the highest probability may be selected for use as the output viseme 224.

The dynamic router 222 in this example includes a concatenation layer 502, which generally operates to concatenate or combine a vector representing the probabilities of a first viseme 216 and a vector representing the probabilities of an associated second viseme 218 to produce a combined vector. The combined vector is provided to a first of at least two fully-connected layers 504, where each fully-connected layer 504 includes nodes that are connected to every node in at least one adjacent fully-connected layer 504. The fully-connected layers 504 are trained to process the combined vectors representing the visemes 216, 218 and generate output results. The output results here are processed using a softmax layer 506, which generates the weights $w_{cf}$ and $w_{cd}$ for the visemes 216, 218. A weighted combiner function 508 receives a vector or other input 510 containing the visemes 216, 218, and the weighted combiner function 508 combines the visemes 216, 218 based on the identified weights $w_{cf}$ and $w_{cd}$ for the visemes 216, 218. This can be done for each set of probabilities in the visemes 216, 218. In some embodiments, each weighted combination of the probabilities of the visemes 216, 218 represents a linear weighted sum based on multiple weights, which may be expressed as follows:

$$y = w_{cf} \times y_{cf} + w_{cd} \times y_{cd}$$

As can be seen in FIG. 5, the weights $w_{cf}$ and $w_{cd}$ used here need not be fixed and can vary based on various factors. For example, the weights $w_{cf}$ and $w_{cd}$ may be determined based on the training of a machine learning model and established based on from which decoder 212, 214 to output the final result.

Although FIGS. 3 and 4 illustrate examples of encoders 204, 206 that may be used in the architecture 200 of FIG. 2 and FIG. 5 illustrates one example of a dynamic router 222 that may be used in the architecture 200 of FIG. 2, various changes may be made to FIGS. 3 through 5. For example, each of the encoders 204, 206 and the dynamic router 222 may be implemented in any other suitable manner.

Figure 6A:
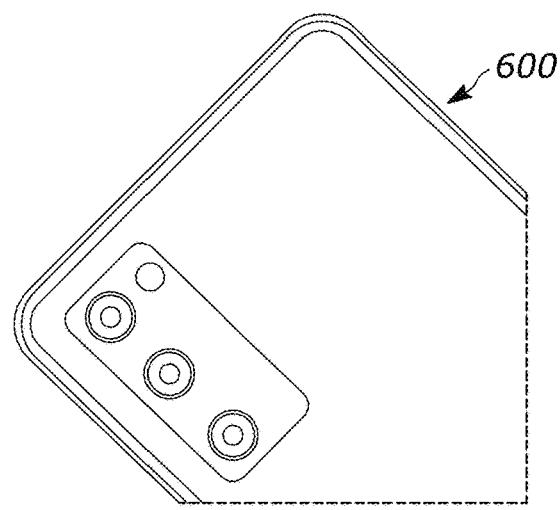
FIGS. 6A through 6C illustrate example devices that may support the use of a light-weight machine learning model for lip sync animation according to this disclosure.
Figure 6B:
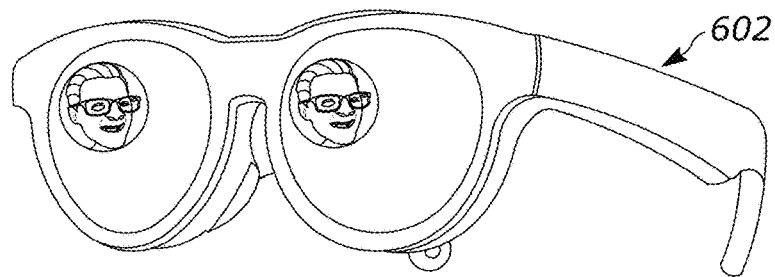
Figure 6C:
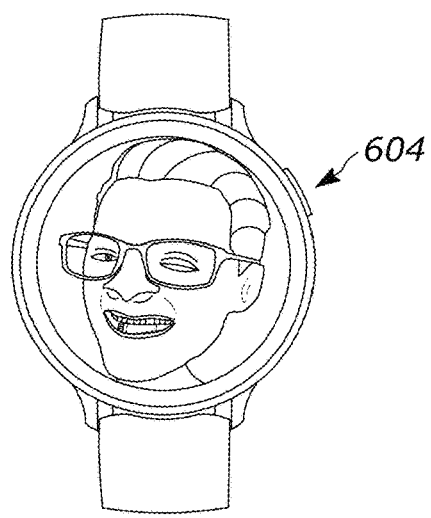

FIGS. 6A through 6C illustrate example devices that may support the use of a light-weight machine learning model for lip sync animation according to this disclosure. More specifically, FIGS. 6A through 6C illustrate examples of devices that may implement, execute, or otherwise support the architecture 200 of FIG. 2 in order to provide lip sync animation. As shown in FIGS. 6A through 6C, the architecture 200 may be supported using a smartphone 600, a pair of AR glasses 602, or a smart watch 604. Each of these devices 600-604 may present a 3D avatar or other character to a user, and each of these devices 600-604 may use the architecture 200 of FIG. 2 to animate the 3D avatar or other character being displayed. As a particular example, each of these devices 600-604 may play audio information to a user while generating facial animations or other visual animations of the 3D avatar or other character based on that audio information. Among other things, this can be performed to make it appear as if the 3D avatar or other character is speaking, and the architecture 200 here helps to provide lip syncing of the 3D avatar or other character with the presented audio information.

In these or other cases, the devices 600-604 may represent mobile or embedded devices that have a relatively limited amount of processing and memory resources (at least compared to other types of devices like personal computers). These or other types of devices may need to have access to and use light-weight machine learning models to support functions such as execution of machine learning-driven apps and on-device adaptation of machine learning models using small sets of training data. In some embodiments, one or more machine learning models used by each device 600-604 to implement the architecture 200 may be trained on device using training data collected by the device 600-604. In some cases, the training data may represent user data, and the training data may be used to provide app personalization and user privacy protection. As particular examples here, the described approaches may allow deep learning-based AR-emoji characters to be presented on low-end smartphones or other devices, possibly including devices that have lower processing powers or that include lower-capacity batteries. Live AR-emoji characters may represent 3D avatars that can talk, show emotions, and exhibit various body expressions.

Figure 7:
FIG. 7 illustrates an example use of a light-weight machine learning model for lip sync animation according to this disclosure.

FIG. 7 illustrates an example use of a light-weight machine learning model for lip sync animation according to this disclosure. As shown in FIG. 7, the use here involves the presentation of a character (such as a 3D avatar 700) on the display screen of a device (such as the display 160 of the electronic device 101). In this particular example, the device represents a smartphone, such as the smartphone 600. However, the same or similar type of use or functionality may be provided in other types of devices, such as the AR glasses 602 and the smart watch 604. In the example of FIG. 7, audio data to be presented to a user of the device may be obtained, where the audio data includes or is processed into speech segments 202. The audio data here may come from any suitable source(s), such as the processor 120, the user, or the server 106.

The audio data is processed as described above using the architecture 200 of FIG. 2 to identify output visemes 224 associated with the audio data. For example, the audio data may be used to generate one or more timed viseme sequences, where each timed viseme sequence generally represents a collection of output visemes 224 and times when the output visemes 224 should be animated. For instance, the one or more timed viseme sequences may be processed using language-based rules to form animation curves or other information. The processor 120 of the device may then modify the presentation of the avatar 700 in order to animate certain movements of the avatar 700 based on the animation curves, such as by modifying the facial animations or body animations of the avatar 700. At the same time, the processor 120 of the device can play the audio data to the user, thereby enabling lip syncing of the presented audio data with the animations of the avatar 700. Note that this functionality may be used with the display of any suitable character on any suitable device and is not limited to the specific avatar 700 and device shown here.

Although FIGS. 6A through 6C illustrate examples of devices 600-604 that may support the use of a light-weight machine learning model for lip sync animation, various changes may be made to FIGS. 6A through 6C. For example, the described techniques may be used with any other suitable devices and are not limited to the three example devices 600-604 shown in FIGS. 6A through 6C. Although FIG. 7 illustrates one example of a use of a light-weight machine learning model for lip sync animation, various changes may be made to FIG. 7. For instance, the described techniques may be used in any other suitable manner, such as to animate any other suitable character.

Figure 8:
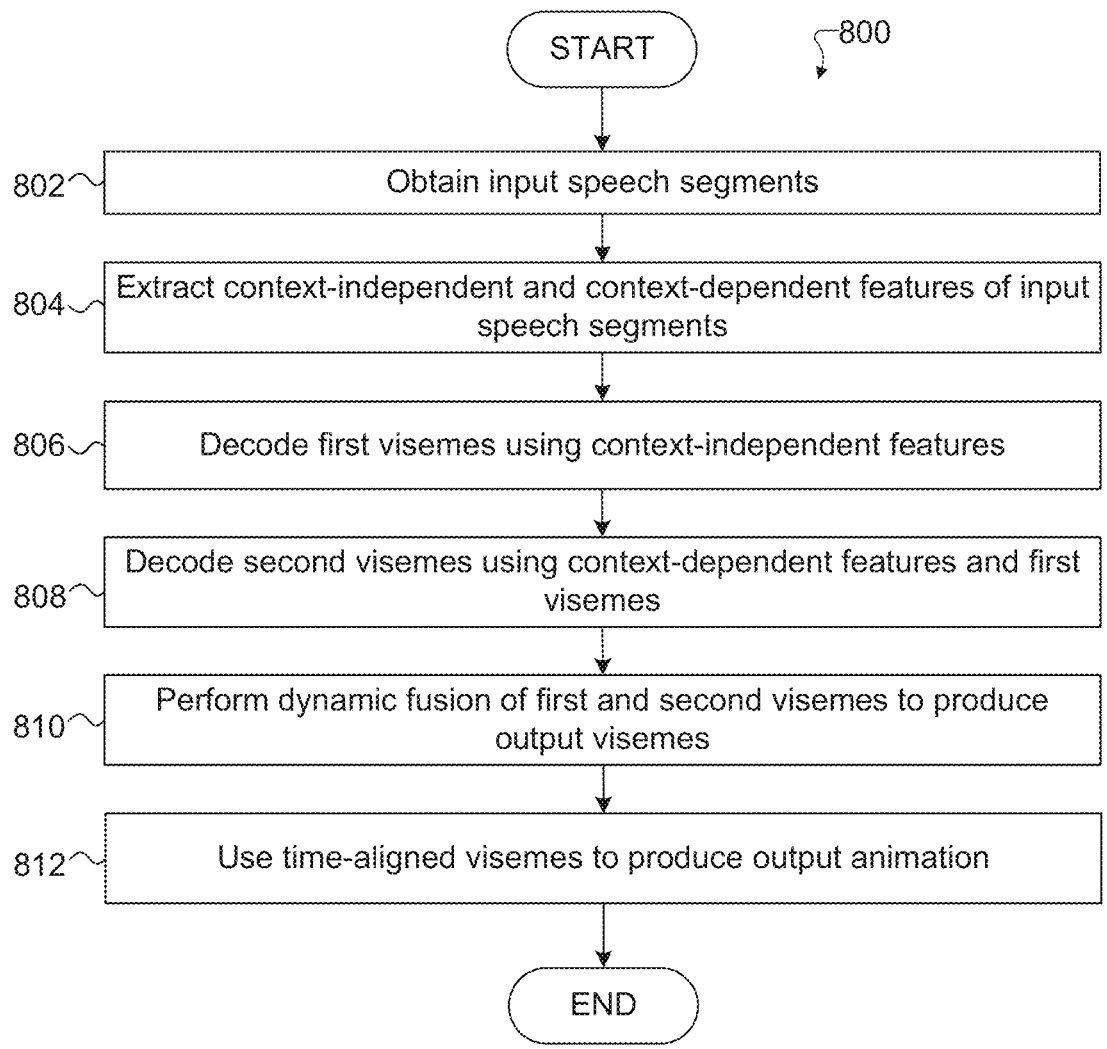
FIG. 8 illustrates an example method for using a light-weight machine learning model for lip sync animation on a mobile device or other device according to this disclosure.

FIG. 8 illustrates an example method 800 for using a light-weight machine learning model for lip sync animation on a mobile device or other device according to this disclosure. For ease of explanation, the method 800 is described as being used by the electronic device 101 in the network configuration 100, where the electronic device 101 supports the architecture 200 of FIG. 2. However, the method 800 may be performed using any other suitable device and in any other suitable system.

As shown in FIG. 8, input speech segments are obtained at step 802. This may include, for example, the processor 120 of the electronic device 101 obtaining input speech segments 202 from a user, from the server 106, or from any other suitable source(s). The input speech segments 202 may typically have or be associated with unknown context-independent features, unknown context-dependent features, unknown context-independent visemes, unknown context-dependent visemes, and unknown output visemes (at least unknown ahead of time).

Context-independent features and context-dependent features of the input speech segments are identified at step 804. This may include, for example, the processor 120 of the electronic device 101 processing the input speech segments 202 using the context-independent encoder 204 and the context-dependent encoder 206 to respectively generate context-independent features 208 and context-dependent features 210 for the input speech segments 202.

First visemes are decoded using the context-independent features at step 806. This may include, for example, the processor 120 of the electronic device 101 processing the context-independent features 208 using the context-independent decoder 212 to decode first visemes 216 associated with the input speech segments 202. Second visemes are decoded using the context-dependent features and the first visemes at step 808. This may include, for example, the processor 120 of the electronic device 101 processing the context-dependent features 210 using the context-dependent decoder 214 to decode second visemes 218 associated with the input speech segments 202. The context-dependent decoder 214 here can use output data 220 from the context-independent decoder 212 when decoding the second visemes 218, such as (i) one or more decoded visemes 216 or other information associated with one or more audio frames before the audio frame currently being decoded by the context-independent decoder 212 and/or (ii) one or more decoded visemes 216 or other information associated with one or more audio frames after the audio frame currently being decoded by the context-independent decoder 212.

Dynamic fusion of the first and second visemes occurs to produce output visemes at step 810. This may include, for example, the processor 120 of the electronic device 101 processing each first viseme 216 and its associated second viseme 218 to produce an output viseme 224. In some cases, each output viseme 224 may be generated as a weighted combination of probabilities of the associated first and second visemes 216, 218, such as a linear weighted sum.

The output visemes may be stored, output, or used in any suitable manner. In this example, time-aligned visemes are used to produce one or more output animations at step 812. This may include, for example, the processor 120 of the electronic device 101 using the output visemes 224, as synchronized or time-aligned with audio information to be presented to a user, in order to produce facial animations, body animations, or other animations of an avatar 700 or other character presented on the electronic device 101. Note that the output visemes 224 may be used in any other suitable manner.

Although FIG. 8 illustrates one example of a method 800 for using a light-weight machine learning model for lip sync animation on a mobile device or other device, various changes may be made to FIG. 8. For example, while shown as a series of steps, various steps in FIG. 8 may overlap, occur in parallel, occur in a different order, or occur any number of times.

Figure 9:
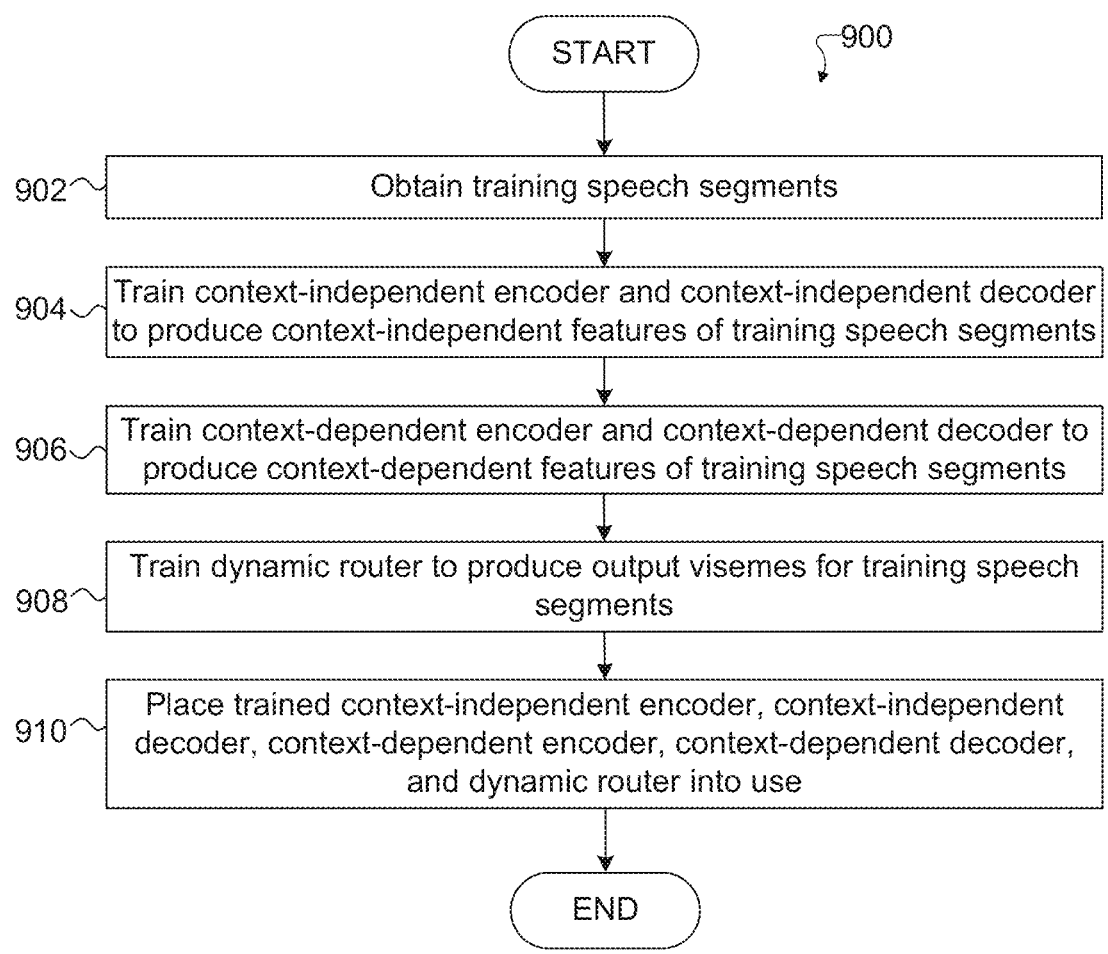
FIG. 9 illustrates an example method for training a machine learning model to support lip sync animation on a mobile device or other device according to this disclosure.

FIG. 9 illustrates an example method 900 for training a machine learning model to support lip sync animation on a mobile device or other device according to this disclosure. For ease of explanation, the method 900 is described as being used by the electronic device 101 in the network configuration 100, where the electronic device 101 supports the architecture 200 of FIG. 2. However, the method 900 may be performed using any other suitable device and in any other suitable system.

As shown in FIG. 9, training speech segments are obtained at step 902. This may include, for example, the processor 120 of the electronic device 101 obtaining training speech segments from a user, from the server 106, or from any other suitable source(s). The training speech segments may typically have or be associated with known context-independent features, known context-dependent features, known context-independent visemes, known context-dependent visemes, and known output visemes (which may be said to represent the "ground truths" for the training process).

A context-independent encoder and a context-independent decoder are trained using the training speech segments at step 904. This may include, for example, the processor 120 of the electronic device 101 training the context-independent encoder 204 and the context-independent decoder 212 to respectively generate correct context-independent features 208 and correct first visemes 216 for the training speech segments. Any suitable machine learning technique may be used here to adjust parameters of the context-independent encoder 204 and the context-independent decoder 212, such as backpropagation. The context-independent encoder 204 and the context-independent decoder 212 are typically trained here to respectively produce context-independent features 208 and first visemes 216 that match the known context-independent features and known context-independent visemes of the ground truths (at least to within some acceptable loss).

A context-dependent encoder and a context-dependent decoder are trained using the training speech segments at step 906. This may include, for example, the processor 120 of the electronic device 101 training the context-dependent encoder 206 and the context-dependent decoder 214 to respectively generate correct context-dependent features 210 and correct second visemes 218 for the training speech segments. Again, any suitable machine learning technique may be used here to adjust parameters of the context-dependent encoder 206 and the context-dependent decoder 214, such as backpropagation. The context-dependent encoder 206 and the context-dependent decoder 214 are typically trained here to respectively produce context-dependent features 210 and second visemes 218 that match the known context-dependent features and known context-dependent visemes of the ground truths (at least to within some acceptable loss). During this training, the parameters of the context-independent encoder 204 and the context-independent decoder 212 may be fixed, thereby preventing modification of the context-independent encoder 204 and the context-independent decoder 212 during the training of the context-dependent encoder 206 and the context-dependent decoder 214.

A dynamic router is trained to produce output visemes for the training speech segments at step 908. This may include, for example, the processor 120 of the electronic device 101 training the dynamic router 222 to generate correct output visemes 224 for the training speech segments. Again, any suitable machine learning technique may be used here to adjust parameters of the dynamic router 222, such as backpropagation. The dynamic router 222 is typically trained here to produce output visemes 224 that match the known output visemes of the ground truths (at least to within some acceptable loss). During this training, the parameters of the context-independent encoder 204, the context-independent decoder 212, the context-dependent encoder 206, and the context-dependent decoder 214 may be fixed, thereby preventing modification of these components during the training of the dynamic router 222.

Once all components of the architecture 200 are suitably trained, the components of the architecture are placed into use at step 910. This may include, for example, the processor 120 of the electronic device 101 placing the components of the architecture 200 into use in order to process new speech segments 202 and generate animations or perform other functions based on the identified output visemes 224.

Although FIG. 9 illustrates one example of a method 900 for training a machine learning model to support lip sync animation on a mobile device or other device, various changes may be made to FIG. 9. For example, while shown as a series of steps, various steps in FIG. 9 may overlap, occur in parallel, occur in a different order, or occur any number of times. Also, any other suitable technique may be used to train a machine learning model to support lip sync animation on a mobile device or other device.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
obtaining a speech segment;
generating, using at least one processing device of an electronic device, context-independent features and context-dependent features of the speech segment;
decoding, using the at least one processing device of the electronic device, a first viseme based on the context-independent features;
decoding, using the at least one processing device of the electronic device, a second viseme based on the context-dependent features and the first viseme; and
generating, using the at least one processing device of the electronic device, an output viseme based on the first and second visemes, the output viseme associated with a visual animation of the speech segment;
wherein generating the output viseme comprises:
generating probabilities of multiple output visemes as weighted combinations of probabilities of the first and second visemes; and
selecting one of the multiple output visemes, the selected output viseme having a highest probability.

2. The method of claim 1, wherein:
generating the context-independent features of the speech segment and decoding the first viseme comprise processing the speech segment using a context-independent encoder that is followed by a context-independent decoder; and
generating the context-dependent features of the speech segment and decoding the second viseme comprise processing the speech segment using a context-dependent encoder that is followed by a context-dependent decoder.

3. The method of claim 2, wherein:
the context-independent decoder generates output data; and
the context-dependent decoder receives the output data.

4. The method of claim 3, wherein:
the speech segment comprises multiple audio frames; and
the output data comprises information based on at least one of (i) one or more audio frames before an audio frame being decoded by the context-independent decoder and (ii) one or more audio frames after the audio frame being decoded by the context-independent decoder.

5. The method of claim 1, wherein:
each weighted combination of the probabilities of the first and second visemes comprises a linear weighted sum based on multiple weights; and
each weight is determined based on training of a machine learning model.

6. The method of claim 1, wherein generating the context-independent features and the context-dependent features of the speech segment comprises generating the context-independent features and the context-dependent features of the speech segment in parallel.

7. A method comprising:
obtaining training speech segments;
training a context-independent encoder and a context-independent decoder to respectively generate context-independent features and first visemes using the training speech segments;
training a context-dependent encoder and a context-dependent decoder to respectively generate context-dependent features and second visemes using the training speech segments;
training a dynamic router to generate first output visemes based on the first and second visemes;
obtaining a specified speech segment;
generating, using at least one processing device of an electronic device, context-independent features and context-dependent features of the specified speech segment;
decoding, using the at least one processing device of the electronic device, a third viseme based on the context-independent features of the specified speech segment;
decoding, using the at least one processing device of the electronic device, a fourth viseme based on the context-dependent features of the specified speech segment and the third viseme; and
generating, using the at least one processing device of the electronic device, a second output viseme based on the third and fourth visemes, the second output viseme associated with a visual animation of the specified speech segment.

8. The method of claim 7, wherein:
the training of the context-dependent encoder and the context-dependent decoder occurs after the training of the context-independent encoder and the context-independent decoder and without modification of parameters of the context-independent encoder and the context-independent decoder; and
the training of the dynamic router occurs after the training of the context-dependent encoder and the context-dependent decoder, without modification of the parameters of the context-independent encoder and the context-independent decoder, and without modification of parameters of the context-dependent encoder and the context-dependent decoder.

9. An apparatus comprising:
at least one processing device configured to:
  obtain a speech segment;
  generate context-independent features and context-dependent features of the speech segment;
  decode a first viseme based on the context-independent features;
  decode a second viseme based on the context-dependent features and the first viseme; and
  generate an output viseme based on the first and second visemes, the output viseme associated with a visual animation of the speech segment;
wherein, to generate the output viseme, the at least one processing device is configured to:
  generate probabilities of multiple output visemes as weighted combinations of probabilities of the first and second visemes; and
  select one of the multiple output visemes, the selected output viseme having a highest probability.

10. The apparatus of claim 9, wherein:
to generate the context-independent features of the speech segment and decode the first viseme, the at least one processing device is configured to process the speech segment using a context-independent encoder that is followed by a context-independent decoder; and
to generate the context-dependent features of the speech segment and decode the second viseme, the at least one processing device is configured to process the speech segment using a context-dependent encoder that is followed by a context-dependent decoder.

11. The apparatus of claim 10, wherein:
the context-independent decoder is configured to generate output data; and
the context-dependent decoder is configured to receive the output data.

12. The apparatus of claim 11, wherein:
the speech segment comprises multiple audio frames; and
the output data comprises information based on at least one of (i) one or more audio frames before an audio frame being decoded by the context-independent decoder and (ii) one or more audio frames after the audio frame being decoded by the context-independent decoder.

13. The apparatus of claim 9, wherein:
each weighted combination of the probabilities of the first and second visemes comprises a linear weighted sum based on multiple weights; and
each weight is determined based on training of a machine learning model.

14. The apparatus of claim 9, wherein the at least one processing device is configured to generate the context-independent features and the context-dependent features of the speech segment in parallel.

15. The apparatus of claim 9, wherein the at least one processing device is further configured to:
  obtain training speech segments;
  train a context-independent encoder and a context-independent decoder to respectively generate context-independent features and third visemes using the training speech segments;
  train a context-dependent encoder and a context-dependent decoder to respectively generate context-dependent features and fourth visemes using the training speech segments; and
  train a dynamic router to generate second output visemes based on the third and fourth visemes.

16. A non-transitory computer readable medium containing instructions that when executed cause at least one processor of an electronic device to:
  obtain a speech segment;
  generate context-independent features and context-dependent features of the speech segment;
  decode a first viseme based on the context-independent features;
  decode a second viseme based on the context-dependent features and the first viseme; and
  generate an output viseme based on the first and second visemes, the output viseme associated with a visual animation of the speech segment;
wherein the instructions that when executed cause the at least one processor to generate the output viseme comprise instructions that when executed cause the at least one processor to:
  generate probabilities of multiple output visemes as weighted combinations of probabilities of the first and second visemes; and
  select one of the multiple output visemes, the selected output viseme having a highest probability.

17. The non-transitory computer readable medium of claim 16, wherein:

the instructions that when executed cause the at least one processor to generate the context-independent features of the speech segment and decode the first viseme comprise:
  instructions that when executed cause the at least one processor to process the speech segment using a context-independent encoder that is followed by a context-independent decoder; and
the instructions that when executed cause the at least one processor to generate the context-dependent features of the speech segment and decode the second viseme comprise:
  instructions that when executed cause the at least one processor to process the speech segment using a context-dependent encoder that is followed by a context-dependent decoder.

18. The non-transitory computer readable medium of claim 17, wherein:
the speech segment comprises multiple audio frames;
the context-independent decoder is configured to generate output data;
the context-dependent decoder is configured to receive the output data; and
the output data comprises information based on at least one of (i) one or more audio frames before an audio frame being decoded by the context-independent decoder and (ii) one or more audio frames after the audio frame being decoded by the context-independent decoder.

19. The non-transitory computer readable medium of claim 16, wherein:
each weighted combination of the probabilities of the first and second visemes comprises a linear weighted sum based on multiple weights; and
each weight is determined based on training of a machine learning model.

20. The non-transitory computer readable medium of claim 16, wherein the instructions that when executed cause the at least one processor to generate the context-independent features and the context-dependent features of the speech segment comprise:
instructions that when executed cause the at least one processor to generate the context-independent features and the context-dependent features of the speech segment in parallel.

* * * * *